US011776141B1

(12) United States Patent
Varghese et al.

(10) Patent No.: US 11,776,141 B1
(45) Date of Patent: Oct. 3, 2023

(54) HYBRID IMAGE REGISTRATION TECHNIQUES

(71) Applicant: Apple Inc., Cupertino, CA (US)

(72) Inventors: Gijesh Varghese, Milpitas, CA (US); Farhan A. Baqai, Fremont, CA (US); Giancarlo Todone, Mountain View, CA (US); Hao Sun, San Jose, CA (US); Richard D. Seely, San Jose, CA (US)

(73) Assignee: Apple Inc., Cupertino, CA (US)

( * ) Notice: Subject to any disclaimer, the term of this patent is extended or adjusted under 35 U.S.C. 154(b) by 196 days.

(21) Appl. No.: 17/357,401

(22) Filed: Jun. 24, 2021

Related U.S. Application Data

(60) Provisional application No. 63/081,680, filed on Sep. 22, 2020.

(51) Int. Cl.
| | |
|---|---|
| *G06T 7/00* | (2017.01) |
| *G06T 7/33* | (2017.01) |
| *G06T 3/00* | (2006.01) |
| *G06T 5/20* | (2006.01) |
| *G06T 5/50* | (2006.01) |

(52) U.S. Cl.
CPC ............ *G06T 7/337* (2017.01); *G06T 3/0093* (2013.01); *G06T 5/20* (2013.01); *G06T 5/50* (2013.01); *G06T 2207/20221* (2013.01)

(58) Field of Classification Search
CPC ......... G06T 7/337; G06T 3/0093; G06T 5/20; G06T 5/50; G06T 2207/20221
See application file for complete search history.

(56) References Cited

U.S. PATENT DOCUMENTS

| 10,715,727 | B2* | 7/2020 | Marineau-Mes | .... H04N 23/683 |
| 11,189,017 | B1* | 11/2021 | Baqai | .................... H04N 23/81 |
| 2005/0013501 | A1* | 1/2005 | Kang | ........................ G06T 5/50 |
| | | | | 382/254 |
| 2012/0293685 | A1* | 11/2012 | Garten | ................... H04N 23/68 |
| | | | | 348/E5.037 |
| 2014/0086464 | A1* | 3/2014 | Brockway | ............... G06T 7/337 |
| | | | | 382/131 |
| 2015/0002704 | A1* | 1/2015 | Vidal-Naquet | ......... G06T 7/337 |
| | | | | 348/241 |

(Continued)

*Primary Examiner* — Oneal R Mistry
*Assistant Examiner* — Vaisali Rao Koppolu
(74) *Attorney, Agent, or Firm* — Blank Rome LLP

(57) ABSTRACT

Devices, methods, and non-transitory program storage devices (NPSDs) for an improved, so-called "hybrid" image registration process are disclosed herein, comprising: obtaining a first set of captured images, wherein the first set of captured images comprises a reference image and one or more bracketed images; and for each of the one or more bracketed images: performing a first (e.g., global) registration operation and a second (e.g., dense, or other localized) registration operation on the bracketed image with respect to the reference image, wherein each of the first and second registration operations produces an output; generating a blend map for the bracketed image, wherein each value in the blend map indicates whether to use the first or second registration operation output for a corresponding one or more pixels when registering the bracketed image with the reference image; and registering the bracketed image with the reference image, according to the generated blend map.

20 Claims, 4 Drawing Sheets

(56) References Cited

U.S. PATENT DOCUMENTS

| | | | |
|---|---|---|---|
| 2016/0028967 A1* | 1/2016 | Sezer | G06T 7/337 348/240.2 |
| 2018/0150962 A1* | 5/2018 | Fletcher | G06T 7/35 |
| 2020/0267300 A1* | 8/2020 | Zhen | G06T 5/40 |

* cited by examiner

HYBRID IMAGE REGISTRATION TECHNIQUES

TECHNICAL FIELD

This disclosure relates generally to the field of digital image processing. More particularly, but not by way of limitation, it relates to techniques for improved image registration.

BACKGROUND

Image registration is the process of warping (or otherwise manipulating) an input image so that it can be overlaid on another image (referred to herein as a "reference mage"), such that the respective contents of the two images align with each other as well as possible after the image registration operation has been performed. There are various reasons why image registration operations may be performed on captured images. For example, multiple image capture devices (e.g., image sensors that are mounted next to each other, such as in a vertical or horizontal orientation, on one side of a single electronic device) that are unaligned may be used to capture concurrent images of the same scene, which images may need to be registered with one another before further image processing operations, such as image fusion, may be performed on said images. Alternatively, it may be desirable to stitch together multiple images or images of different parts of the same scene that are captured by a single image capture device held at different poses and/or over a given time interval (e.g., in the case of a user capturing a longer exposure image that is made from fusing together several individual shorter exposure images captured over a given time interval). In machine vision applications, stereo cameras may also be used to provide depth of field (and other advantages) which, in turn, may require that the images from the stereo cameras are properly registered before further analysis may be performed.

An "image feature," as used herein, preferably contains two components: 1) an image coordinate; and 2) a feature descriptor, which may be algorithmically-derived from the image content in an area surrounding the feature's image coordinate. A typical method to register images may involve identifying matching image features in both an input image (also referred to herein as a "candidate image" or "bracketed image," in certain contexts) and the reference image and then calculating a mapping function (e.g., a warping function, or other set of equations and/or parameters describing a desired transformation), such that the coordinates of the set of image features in the input image are transformed, via the calculated mapping function, to be as close as possible to the coordinates of the respective matching image features in the reference image.

If enough matching image features are found between the images being registered (and such image features are sufficiently spatially-distributed in the images), then the mapping function can be applied to each pixel in the input image (i.e., not merely the pixels at the coordinates of the identified matching image features) to warp the input image so that it can be overlaid on the reference image. This type of registration is also referred to herein as a "global registration operation." Different methods for generating mapping functions exist, e.g., depending on what changes or "transformations" are expected between the two images. Typical transformations that can be accounted for by standard mapping functions may include, e.g.: pan, tilt, roll, translation, and/or zoom of the image capture devices In other cases, rather than finding a single mapping function to perform a global registration operation, e.g., based on a small subset of strongly-matching image features, it may be desirable to perform a more localized or so-called "dense registration operation," wherein a matching pixel is attempted to be located for each pixel (or as many pixels as is possible) in the input image that is being registered with the reference image. If a dense registration operation cannot find a good enough match for a given pixel, it may, e.g., use one or more smoothness constraints to propagate a satisfactory match from elsewhere in the image. However, unlike in the case of global registration operations, there is effectively no restriction of the types of transformations that are allowed to be determined between the input image and the reference image in dense registration operations, which leads to a much larger number of transformation parameters that must be determined by the dense registration operation. This makes dense registration operations much more complex and processing-intensive to solve than global registration operations. Moreover, while dense registration operations have the advantage of being able to fix subtle differences between candidate images and reference images, they can leave considerable artifacts in regions of the reference image where global registration operations typically have greater success (e.g., due to global registration operations using a parametric form of homography that ensures points preserve collinearity after transformation, which is not guaranteed in optical flow-based or other dense registration operations), e.g., regions of the reference image containing higher-level structures, such as straight lines, rigid structures, buildings, and the like.

Thus, it would be desirable to have methods and systems that provide for unproved so-called "hybrid" image registration techniques, which can intelligently leverage and blend between the results of multiple registration operations, e.g.: (1) global registration operations (e.g., to be used predominantly in those regions of the input image that are best-suited to an image-level global mapping function, such as rigid structures and buildings); and (2) dense registration operations (e.g., to be used predominantly in those regions of the input image best-suited to more localized registration techniques, such as feature-rich and finely-detailed regions of the input image).

SUMMARY

Devices, methods, and non-transitory program storage devices (NPSDs) are disclosed herein to provide for improved hybrid image registration. According to some embodiments, there is provided a device, comprising: a memory; and one or more processors operatively coupled to the memory, wherein the one or more processors are configured to execute instructions causing the one or more processors to: obtain a first set of captured images, wherein the first set of captured images comprises a reference image and one or more bracketed images; and for each of the one or more bracketed images: perform a first (e.g., global) registration operation and a second (e.g., dense) registration operation on the bracketed image with respect to the reference image, wherein each of the first registration operation and the second registration operation produces an output; generate a blend map for the bracketed image, wherein each value in the blend map indicates whether to use the first registration operation output or the second registration operation output for a corresponding one or more pixels when registering the bracketed image with the reference image; and register the bracketed image with the reference image, according to the generated blend map.

In some embodiments, the device may further comprise one or more image capture devices (e.g., cameras, optical sensors, or the like), wherein the one or more image capture devices are configured to capture the first set of captured images. In some embodiments, the first registration operation comprises a global registration operation, and the second registration operation comprises a dense registration operation. In such embodiments, the output of the global registration operation for at least one of the bracketed images may comprise a parameterized transformation. In still other embodiments, the output of the dense registration operation for at least one of the bracketed images may comprise a plurality of local transformations.

In other embodiments, the first registration operation may comprise a first dense registration operation and the second registration operation may comprise a second dense registration operation, wherein the first dense registration operation and second dense registration operation are tuned differently from one another. In still other embodiments, three or more registration operations may be used to generate the blend map for a given bracketed image (e.g., one global registration operation and two different dense registration operations, etc.). In cases where three (or more) registration operations are used, the generation of the blend map for a given bracketed image may comprise the generation of a blend map, wherein each value in the blend map indicates whether (and/or to what extent) to use the first, second, and third (or more) registration operation outputs for a corresponding one or more pixels when registering the given bracketed image with the reference image.

In yet other embodiments, the output of at least one of the registration operations for at least one of the bracketed images comprises a registered version of the at least one bracketed image with respect to the reference image.

In other embodiments, the blend map may be generated according to a determined distance metric (e.g., a Normalized Cross-Correlation (NCC) output or a Sum of Absolute Differences (SAD) output) that is calculated between the bracketed image and the reference image. In still other embodiments, the generated blend map may be further refined according to a regularization operation (e.g., a joint bilateral filter (JBF) or a guided filter) to generate a refined blend map, wherein the process of registering the bracketed image with the reference image may be further carried out according to the generated refined blend map (i.e., rather than the initially generated blend map). In yet other embodiments, once the one or more bracketed images have been registered with the reference image, they may be fused, in order to generate a fused output image.

Various non-transitory program storage device (NPSD) embodiments are also disclosed herein. Such NPSDs are readable by one or more processors. Instructions may be stored on the NPSDs for causing the one or more processors to perform any of the embodiments disclosed herein. Various image processing methods are also disclosed herein, in accordance with the device and NPSD embodiments disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Exemplary System for Performing Hybrid Image Registration

Figure 1:
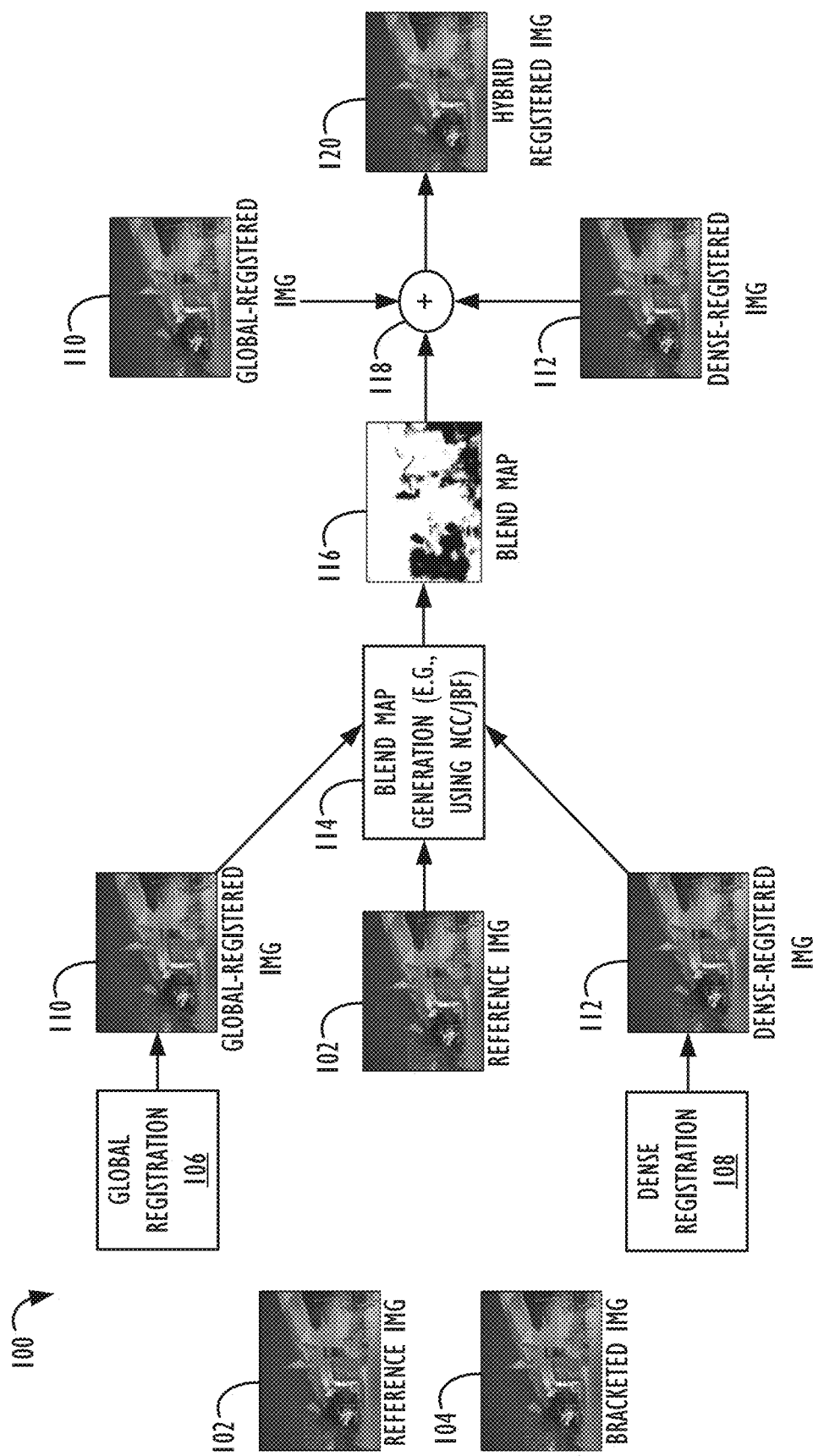
FIG. 1 illustrates an exemplary system for performing hybrid image registration techniques, according to one or more embodiments.

Turning now to FIG. 1, an exemplary system 100 for performing hybrid image registration techniques is shown, according to one or more embodiments. Beginning at the left-hand side of FIG. 1, a hybrid registration operation is illustrated for an exemplary reference image 102 and bracketed image 104. Bracketed image 104 may comprise, e.g., any one of a number of images captured by an image capture device, e.g., along with the reference image 102, in response to a user activating a shutter or capture button of the image capture device. Each bracketed image captured along with a reference image may have the same or different exposure settings to the reference image. Further, each bracketed image may have the same or different exposure settings to the other captured bracketed images (though, typically, each bracketed image will have different exposure settings from at least one other captured bracketed image and the reference image).

Next, for each bracketed image 104, a first registration operation, e.g., global registration operation 106, may be performed to generate a globally-registered image 110, and a second registration operation, e.g., dense registration operation 108, may be performed to generate a densely-registered image 112. As mentioned above, global registration operations may seek to determine one or more global mapping functions to transform an entire bracketed image (e.g., based on a small subset of identified matching image features), while dense registration operations may seek to find a transformation for each pixel (or as many pixels as is possible) in the bracketed image 104 to match with a corresponding pixel in the reference image 102, with fewer constraints on the types of transformations that may be determined.

Next, at block 114, a blend map 116 may be generated for the bracketed image 104, e.g., using a distance metric, such as NCC or SAD, wherein each value in the blend map indicates whether to use the first, e.g., global, registration operation output 110 (wherein global registration operations are typically preferred in feature-poor regions of the image) or the second, e.g., dense, registration operation output 112 (wherein dense registration operations are typically preferred in feature-rich regions of the image) for a corresponding one or more pixels when registering the bracketed image with the reference image.

As will be explained in greater detail below with reference to FIG. 2, in some cases, such as illustrated in the example of FIG. 1, an initial blend map may be further refined via one or more regularization operations (e.g., use of a JBF) before being used at block 118 to blend between the first, i.e., global, registration operation output 110 and the second, i.e., dense registration operation output 112. Based on the values in the blend map 116, a hybrid registered image 120 may be generated, which comprises the desired blended result of using: (1) the output of the global registration operations in those regions of the reference image that are best-suited to an image-level global mapping function (e.g., rigid structures and buildings); and (2) the output of dense registration operations in those regions of the reference image best-suited to more localized registration techniques (e.g., feature-rich and finely-detailed regions of the reference image).

Figure 2:
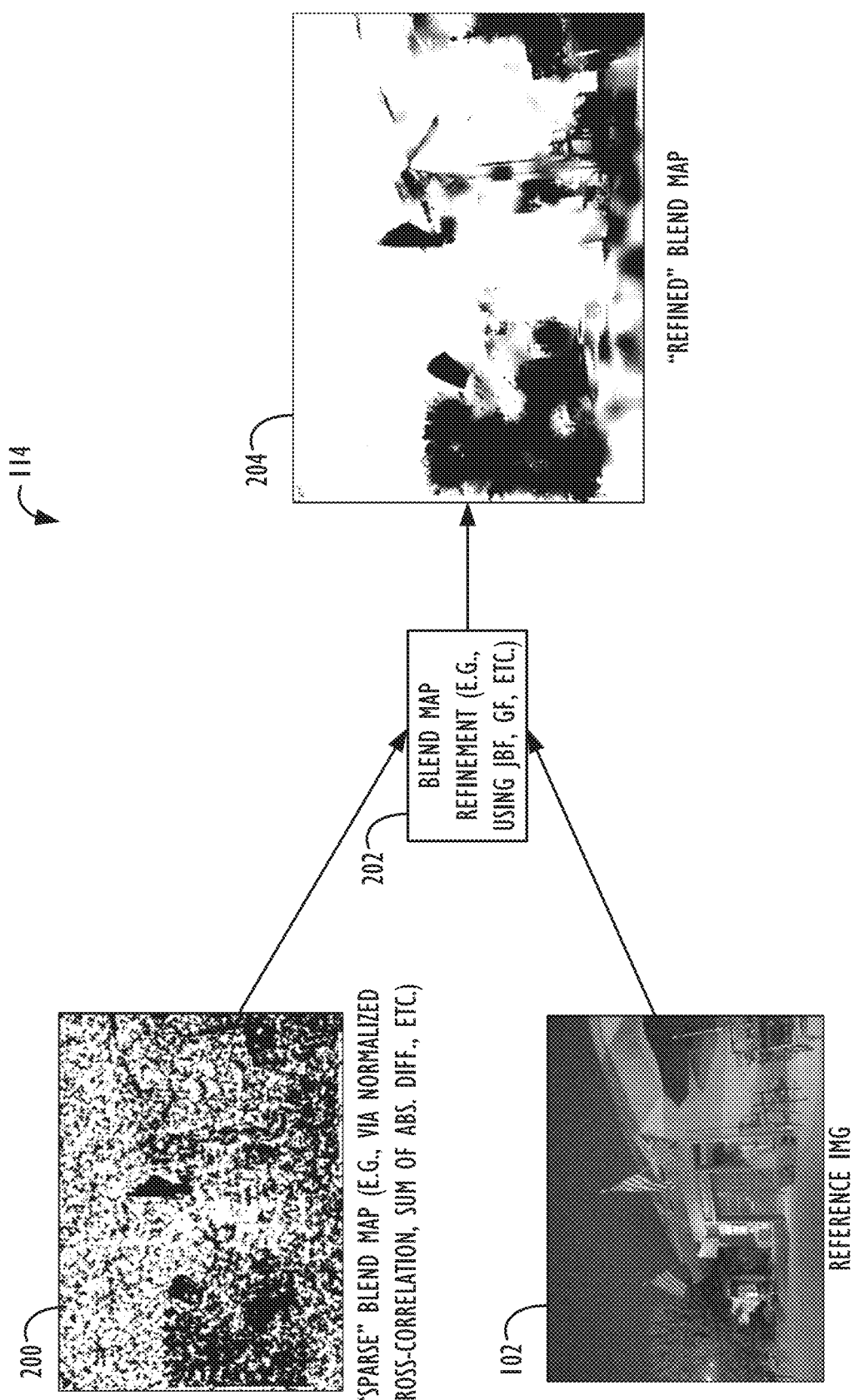
FIG. 2 illustrates an exemplary system for creating a refined blend map, according to one or more embodiments.

Turning now to FIG. 2, an exemplary system for creating a refined blend map is shown, according to one or more embodiments. FIG. 2 illustrates greater detail related to block 114 described above, with reference to FIG. 1. Image 200 represents an initial or "sparse" blend map created for a given bracketed image (e.g., as computed using a distance metric, such as NCC or SAD), wherein white pixels in image 200 may indicate to use a global registration operation output when registering the given bracketed image to the reference image, and black pixels in image 200 may indicate to use a local or dense registration operation output when registering the given bracketed image to the reference image. As may be understood, a distance metric such as NCC may advantageously be agnostic to intensity changes, spectral changes, and the like, but can only be used to compare across images in regions of dense feature detail. Meanwhile, a distance metric such as SAD may work better in comparing across images in regions that are less feature-rich. In some embodiments, only bracketed images showing strong NCC scores may be considered for inclusion in subsequent registration and/or fusion operations, in order to attempt to remove overly blurry or poor quality images that may create fusion artifacts.

In some embodiments, it has been determined that better image registration results may be achieved by refining the initial or "sparse" blend map (such as is shown in image 200), e.g., by densifying the contents of the initial blend map. In some cases, this is achieved by performing a blend map refinement operation at block 202, e.g., by performing one or more regularization operations, e.g., using a joint bilateral filter (JBF) operation, least squares technique, and/or other guided filter (GF) operation, i.e., guided by reference image 102, to produce a smoother, so-called "refined" blend map 204 (also shown at block 116 of FIG. 1), which may be used to inform any subsequent hybrid registration operations.

According to some embodiments, a JBF may be implemented in the performance of the blend map refinement operation that assigns each registration operation output a class label (e.g., a class label of '0' for the first registration operation output and a class label of '1' for the second registration operation output, or vice versa), and then averages the 0's and 1's to produce the blend map. In cases where additional registration operations (i.e., more than two) are used, the JBF may compute its averages for each pixel across all class label identifiers (e.g., 0, 1, 2, 3, etc.) and then quantize the averaged value to the nearest integer to resolve any ambiguities and select the best registration operation output to use for a given pixel(s). In still other cases, the determination of which registration operation output to use (and/or to what extent it should be used) for a given pixel(s) may further be based on the manner in which the particular registration operation was tuned or optimized. For example, in a case where a first dense registration operation has been tuned for brightly-lit scenes and a second dense registration operation has been tuned for low-light scenes, the determination of which dense registration operation's output to use (and/or to what extent it should be used) for a given pixel(s) may be based on an average pixel luminance for the pixel(s) in question.

Exemplary Method for Performing Hybrid Image Registration

Figure 3:
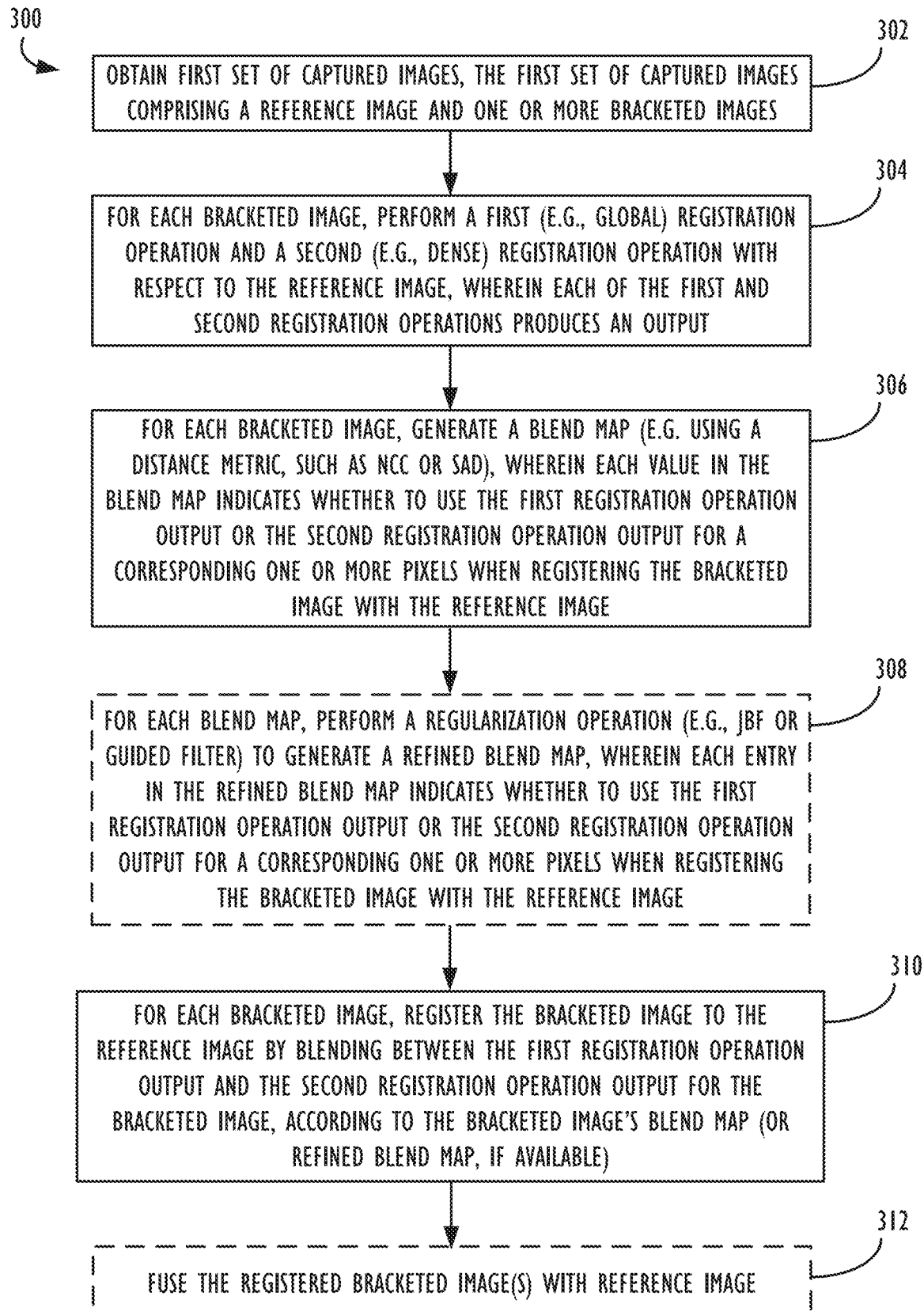
FIG. 3 is a flow chart illustrating a method of performing hybrid image registration, according to various embodiments.

Turning now to FIG. 3, a flow chart 300 illustrating a r Method of performing hybrid image registration is shown, according to various embodiments. First, at Step 302, the method 300 may obtain a first set of captured images, wherein the first set of captured images comprise a reference image and one or more bracketed images. Next, at Step 304, the method 300 may, for each bracketed image, perform a first (e.g., global) registration operation and a second (e.g., dense) registration operation with respect to the reference image, wherein each of the first and second registration operations produces an output. In some embodiments, the output of one or more of the registration operations for one or more of the bracketed images may comprise a set of transformation parameters, while, in other embodiments, the output of one or more of the registration operations for one or more of the bracketed images may comprise an actual warped image resulting from the application of the respective registration operation.

Next, at Step 306, the method 300 may, for each bracketed image, generate a blend map (e.g. using a distance metric, such as NCC or SAD), wherein each value in the blend map (which may, e.g., take the form of a 2D array of pixel values) indicates whether to use the first registration operation output or the second registration operation output for a corresponding one or more pixels when registering the bracketed image with the reference image. For example, in the case of a binary blend map, a value of '1' may indicate a determination to use the output of the first (e.g., global) registration for a given pixel (or set of pixels) in a bracketed image, and a value of '0' may indicate a determination to use the output of the second (e.g., dense) registration for a given pixel (or set of pixels) in a bracketed image.

Next, at Step 308, if so desired, the method 300 may, for each blend map generated at Step 306, perform a regularization operation (e.g., BF or other guided filter operation) to generate a refined blend map, wherein each entry in the refined blend map indicates whether (and/or to what extent) to use the first registration operation output or the second registration operation output for a corresponding one or more pixels when registering the bracketed image with the reference image. It has been determined that generating a refined blend map may produce a smoother and more artifact-free registered image, as it is less coarse than the initially-generated "sparse" blend map and typically can provide better results for regions of an image that the distance metric selected for generation of the initial blend map may struggle in (e.g., due to feature-richness, or a lack thereof).

Next, at Step 310, the method 300 may, for each bracketed image, register the bracketed image to the reference image by blending between the first registration operation output and the second registration operation output for the bracketed image, according to the bracketed image's blend map (or refined blend map, if available from Step 308), Finally, at Step 312, the method 300 may fuse the registered one or more bracketed images with the reference image, if so desired. (Note: The optionality of the performance of certain steps, e.g., Steps 308 and 312, is indicated by the use of dashed line boxes in FIG. 3.)

While one or more of the examples given above refers to using a global registration operation as the first registration operation and a dense registration operation as the second registration operation, it is to be understood that this pairing of registration operation types for usage as the first and second registration operations, respectively, is merely illustrative, and pairing of other types of registration operations (as well as combinations of three or more registration operations to select between when generating the blend map) are also possible. For example, in some instances, the first and second registration operations may comprise two different dense registration operations, each optimized and/or tuned for different qualities or scene types (e.g., one tuned for brightly-lit scenes and one tuned for low-light scenes, or one tuned for feature-rich areas of a scene and one tuned for feature-poor areas of a scene, etc.). In other instances, the first and second registration operations may comprise two different global registration operations, also each tuned for different qualities or scene types. As mentioned above, in still other embodiments, three or more registration operations could be performed for each bracketed image, e.g., one global registration operation and two or more different kinds of dense registration operations, and so forth.

Exemplary Electronic Computing Devices

Figure 4:
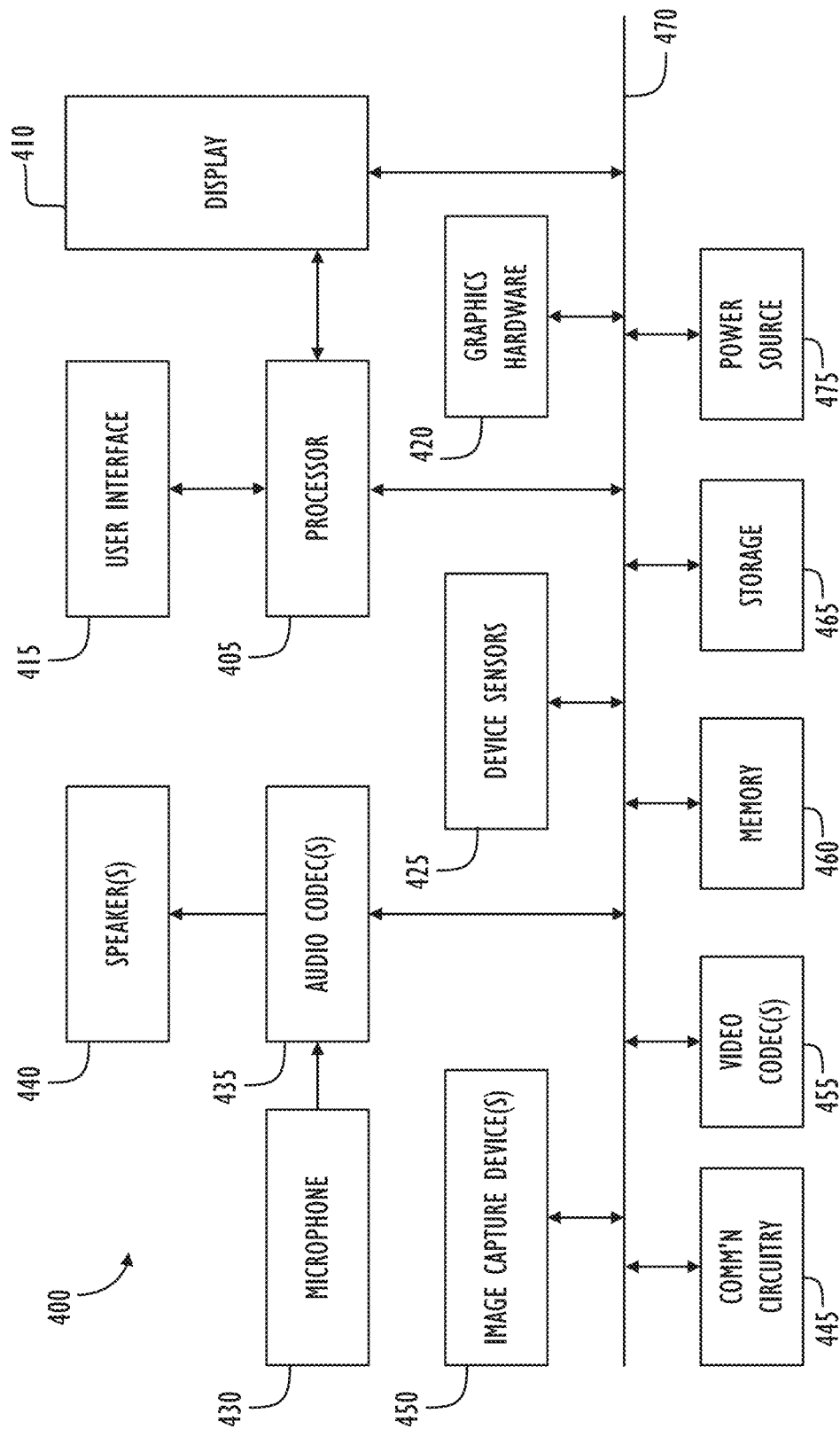
FIG. 4 is a block diagram illustrating a programmable electronic computing device, in which one or more of the techniques disclosed herein may be implemented.

Referring now to FIG. 4, a simplified functional block diagram of illustrative programmable electronic computing device 400 is shown according to one embodiment. Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer, inertial measurement unit, and/or gyroscope), microphone 430, audio codec(s) 435, speaker(s) 440, communications circuitry 445, image capture device 450, which may, e.g., comprise multiple camera units/optical image sensors having different characteristics or abilities (e.g., Still Image Stabilization (SIS), HDR, OIS systems, optical zoom, digital zoom, etc.), video codec(s) 455, memory 460, storage 465, and communications bus 470.

Processor 405 may execute instructions necessary to carry out or control the operation of many functions performed by electronic device 400 (e.g., such as the generation and/or processing of images in accordance with the various embodiments described herein). Processor 405 may, for instance, drive display 410 and receive user input from user interface 415, User interface 415 can take a variety of forms, such as a button, keypad, dial, a click wheel, keyboard, display screen and/or a touch screen. User interface 415 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 410 may display a video stream as it is captured while processor 405 and/or graphics hardware 420 and/or image capture circuitry contemporaneously generate and store the video stream in memory 460 and/or storage 465. Processor 405 may be a system-on-chip (SOC) such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs) and/or one or r yore specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 450 may comprise one or more camera units configured to capture images, e.g., images which may be processed to generate registered versions of said captured images, e.g., in accordance with this disclosure. Output from image capture device 450 may be processed, at least in part, by video codec(s) 455 and/or processor 405 and/or graphics hardware 420, and/or a dedicated image processing unit or image signal processor incorporated within image capture device 450. Images so captured may be stored in memory 460 and/or storage 465. Memory 460 may include one or more different types of media used by processor 405, graphics hardware 420, and image capture device 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more r nodules and written in any desired computer programming language. When executed by, for example, processor 405, such computer program code may implement one or more of the methods or processes described herein. Power source 475 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 400.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
    a memory; and
    one or more processors operatively coupled to the memory, wherein the one or more processors are configured to execute instructions causing the one or more processors to:
        obtain a first set of captured images, wherein the first set of captured images comprises a reference image and one or more bracketed images; and
        for each of the one or more bracketed images:
            perform a first registration operation and a second registration operation on the bracketed image with respect to the reference image, wherein each of the first registration operation and the second registration operation produces an output;
            generate a blend map for the bracketed image, wherein each value in the blend map indicates whether to use the first registration operation output or the second registration operation output for a corresponding one or more pixels when registering the bracketed image with the reference image; and
            register the bracketed image with the reference image, according to the generated blend map.

2. The device of claim 1, wherein the first registration operation comprises a global registration operation, and wherein the second registration operation comprises a dense registration operation.

3. The device of claim 2, wherein the output of the first registration operation for at least one of the bracketed images comprises a parameterized transformation.

4. The device of claim 3, wherein the output of the second registration operation for at least one of the bracketed images comprises a plurality of local transformations.

5. The device of claim 1, wherein the first registration operation comprises a first dense registration operation, wherein the second registration operation comprises a second dense registration operation, and wherein the first dense registration operation and second dense registration operation are tuned differently from one another.

6. The device of claim 1, wherein the instructions causing the one or more processors to generate a blend map for the bracketed image further comprise instructions causing the one or more processors to:
    generate a blend map according to a determined distance metric calculated between the bracketed image and the reference image.

7. The device of claim 6, wherein the distance metric comprises at least one of: a Normalized Cross-Correlation (NCC) output or a Sum of Absolute Differences (SAD) output.

8. The device of claim 1, wherein the instructions further comprise instructions causing the one or more processors to:
    refine the generated blend map according to a regularization operation to generate a refined blend map, and
    wherein the instructions causing the one or more processors to register the bracketed image with the reference image further comprise instructions causing the one or more processors to register the bracketed image with the reference image according to the refined blend map.

9. The device of claim 8, wherein the regularization operation comprises at least one of: a joint bilateral filter (JBF) or a guided filter.

10. The device of claim 1, wherein the instructions further comprise instructions causing the one or more processors to:
    fuse the registered one or more bracketed images with the reference image to generate a fused output image.

11. A non-transitory program storage device comprising computer readable instructions executable by one or more processors to cause the one or more processors to:
    obtain a first set of captured images, wherein the first set of captured images comprises a reference image and one or more bracketed images; and
    for each of the one or more bracketed images:
        perform a first registration operation and a second registration operation on the bracketed image with respect to the reference image, wherein each of the first registration operation and the second registration operation produces an output;
        generate a blend map for the bracketed image, wherein each value in the blend map indicates whether to use the first registration operation output or the second registration operation output for a corresponding one or more pixels when registering the bracketed image with the reference image; and
        register the bracketed image with the reference image, according to the generated blend map.

12. The non-transitory program storage device of claim 11, wherein the instructions causing the one or more processors to generate a blend map for the bracketed image further comprise instructions causing the one or more processors to:
    generate a blend map according to a determined distance metric calculated between the bracketed image and the reference image.

13. The non-transitory program storage device of claim 11, wherein the instructions further comprise instructions executable by the one or more processors to cause the one or more processors to:
    for each of the one or more bracketed images: perform a third registration operation on the bracketed image with respect to the reference image, wherein the third registration operation produces an output; and
    wherein the instructions causing the one or more processors to generate a blend map for each bracketed image further comprise instructions causing the one or more processors to, for each of the one or more bracketed images:
        generate a blend map for the bracketed image, wherein each value in the blend map further indicates whether to use the first registration operation output, the second registration operation output, or the third registration operation output for a corresponding one or more pixels when registering the bracketed image with the reference image.

14. The non-transitory program storage device of claim 11, wherein the instructions further comprise instructions causing the one or more processors to:
    refine the generated blend map according to a regularization operation to generate a refined blend map, and
    wherein the instructions causing the one or more processors to register the bracketed image with the reference image further comprise instructions causing the one or more processors to register the bracketed image with the reference image according to the refined blend map.

15. The non-transitory program storage device of claim 14, wherein the first registration operation comprises a global registration operation, and wherein the second registration operation comprises a dense registration operation.

16. An image processing method, comprising:
obtaining a first set of captured images, wherein the first set of captured images comprises a reference image and one or more bracketed images; and
for each of the one or more bracketed images:
performing a global registration operation and a dense registration operation on the bracketed image with respect to the reference image, wherein each of the global registration operation and the dense registration operation produces an output;
generating a blend map for the bracketed image, wherein each value in the blend map indicates whether to use the global registration operation output or the dense registration operation output for a corresponding one or more pixels when registering the bracketed image with the reference image; and
registering the bracketed image with the reference image, according to the generated blend map.

17. The method of claim 16, wherein generating a blend map for the bracketed image further comprises:
generating a blend map according to a determined distance metric calculated between the bracketed image and the reference image.

18. The method of claim 16, further comprising:
for each of the one or more bracketed images: performing a third registration operation on the bracketed image with respect to the reference image, wherein the third registration operation produces an output; and
wherein generating a blend map for each bracketed image further comprises, for each of the one or more bracketed images:
generating a blend map for the bracketed image, wherein each value in the blend map further indicates whether to use the first registration operation output, the second registration operation output, or the third registration operation output for a corresponding one or more pixels when registering the bracketed image with the reference image.

19. The method of claim 16, further comprising:
refining the generated blend map according to a regularization operation to generate a refined blend map, and
wherein registering the bracketed image with the reference image further comprises registering the bracketed image with the reference image according to the refined blend map.

20. The method of claim 19, wherein the first registration operation comprises a global registration operation, and wherein the second registration operation comprises a dense registration operation.

* * * * *